United States Patent [19]

Yamawaki

[11] Patent Number: 4,903,132
[45] Date of Patent: Feb. 20, 1990

[54] ELECTRONIC STILL CAMERA WITH SLOW-IN, FAST OUT MEMORY ADDRESSING

[75] Inventor: Masao Yamawaki, Itami, Japan
[73] Assignee: Mitsubishi Denki Kabushiki Kaisha, Tokyo, Japan
[21] Appl. No.: 248,713
[22] Filed: Sep. 26, 1988
[30] Foreign Application Priority Data Sep. 26, 1987 [JP] Japan .................................. 62-241055

[51] Int. Cl.[4] ............................................... H04N 5/76
[52] U.S. Cl. .............................. 358/209; 358/213.11; 358/335; 358/909
[58] Field of Search ............... 358/212, 335, 336, 909, 358/209, 41; 340/798

[56] References Cited

U.S. PATENT DOCUMENTS

| | | | |
|---|---|---|---|
| 4,646,166 | 2/1987 | Arlan | 358/909 X |
| 4,647,976 | 3/1987 | Nakagaki et al. | 358/335 X |
| 4,750,041 | 6/1988 | Vogel et al. | 358/909 X |
| 4,792,863 | 12/1988 | Urabe | 358/335 |
| 4,803,554 | 2/1989 | Pape | 358/209 |
| 4,805,010 | 2/1989 | Shroyer et al. | 358/909 X |
| 4,805,037 | 2/1989 | Noble et al. | 358/335 |
| 4,812,836 | 3/1989 | Kurakake et al. | 340/798 X |

FOREIGN PATENT DOCUMENTS 54-136325 3/1978 Japan .

Primary Examiner—James J. Groody
Assistant Examiner—Mark R. Powell
Attorney, Agent, or Firm—Lowe, Price, LeBlanc, Becker & Shur

[57] ABSTRACT

An electronic still camera which is provided with a video RAM temporarily storing a video signal outputted from an image pickup element, and reads out the video signal stored in the video RAM so as to record the signal in a floppy disc or format-convert it for a printer or an NTSC system, whereby the operation timing of the image pickup element can be controlled independently of other apparatus utilizing the output of the element, resulting in that the electronic still camera is realizable of high resolution without having a high frequency characteristic of the image pickup element.

11 Claims, 5 Drawing Sheets

ELECTRONIC STILL CAMERA WITH SLOW-IN, FAST OUT MEMORY ADDRESSING

BACKGROUND OF THE INVENTION

1. Field of the Invention

The present invention relates to an electronic still camera, and more particularly to an electronic still camera which converts a still picture of an object by an image pickup element into a color video signal and records the signal.

2. Description of the Prior Art

FIG. 1 is a schematic block diagram showing structure of the conventional electronic still camera, in which an image pickup element 1 photoelectrically converts a still image of an object so as to output a color video signal, and a camera tube or a solid state image pickup element is used for the image pickup element 1. The outputted color video signal of the image pickup element 1 is given to a signal processing circuit 2 and subjected to various signal processings (for example, separation of a luminance signal and a chrominance signal). The output signal of the signal processing circuit 2 is given to an NTSC (National Television System Committee) signal processing circuit 3 and converted into an NTSC system composite TV signal. The output signal of the NTSC signal processing circuit 3 is given to a recording device 4, such as a floppy disc drive unit, and recorded therein. The output signal of the NTSC signal processing circuit 3 is also given to an output terminal 5 and outputted therefrom to an external equipment (for example, a monitor TV or a printer). A timing generator 6 controls operations of the image pickup element 1, signal processing circuit 2, NTSC signal processing circuit 3 and recording device 4. In detail, the timing generator 6 controls the image pickup element 1 to be driven at the synchronous speed defined by the NTSC system, and outputs a clamp pulse and a synchronizing signal to the signal processing circuit 2, the synchronizing signal to the NTSC signal processing circuit 3, and a synchronizing control signal to the recording device 4.

Since the conventional electronic still camera, as above-mentioned, is controlled by the timing generator 6 of the operation speeds of the entire circuits to comply with the synchronous speed defined by the NTSC system, it has been difficult to satisfy both high resolution and low noise requirements. In other words, it is difficult that both the functions of observing the image pickup result by a monitor TV and of printing it by a printer are satisfied together. Next, the reason for this will be described. First, from the viewpoint of high resolution (especially required at the printer), the number of vertical scanning lines is restricted by the NTSC system, thereby creating a problem that the vertical resolution, when printed, deteriorates. Similarly, as to the horizontal resolution, the NTSC system is limited (to about 350 TV lines) and more resolution can not be desired. On the other hand, in order to improve the horizontal resolution as much as possible, the number of picture elements of theh image pickup element 1 needs to be increased and the horizontal read-out frequency thereof needs to be high, and therefore it is required that the image pickup element 1 and signal processing circuit 2 are designed to have a high frequency characteristic. However, when they are of high frequency, the color video signal is deteriorated, or power consumption increases.

SUMMARY OF THE INVENTION

In order to solve the above problem, the present invention has been designed. An object thereof is to provide an electronic still camera which once writes an output of image pickup means in image storage means and reads out the video signal stored in the image storage means and records or processes (for example, format conversion) the stored video signal, so that the operation timing of image pickup means is controlled independently of other apparatus utilizing the output thereof, thereby satisfying both the high resolution and low noises requirements.

The above and further objects and features of the invention will more fully be apparent from the following detailed description with accompanying drawings.

DESCRIPTION OF THE PREFERRED EMBODIMENT

Figure 2:
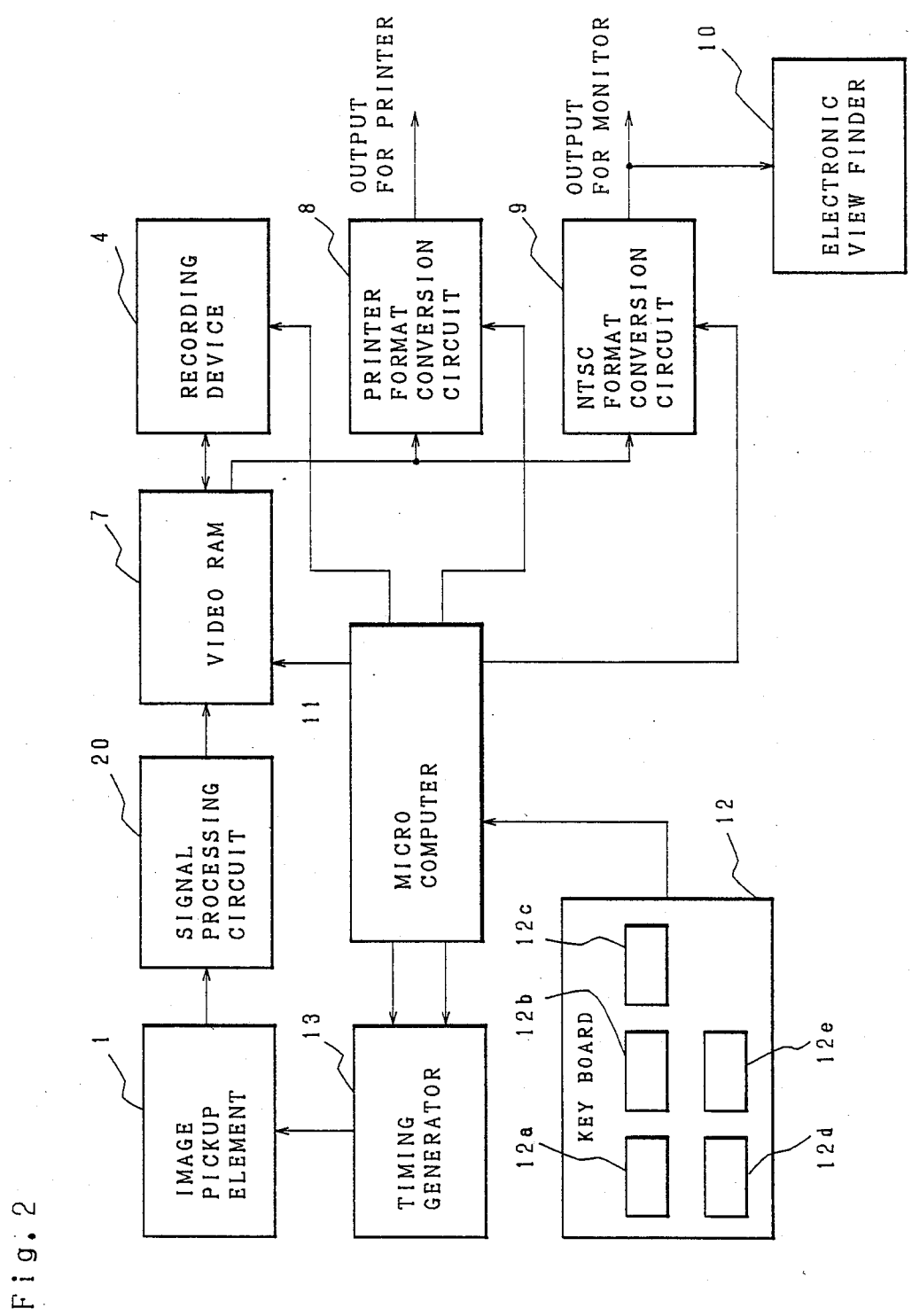
FIG. 2 is a schematic block diagram of an embodiment of an electronic still camera of the invention.

FIG. 2 is a schematic block diagram of an embodiment of an electronic still camera of the invention. Referring to FIG. 2, an image pickup element 1, for example, a camera tube or a solid state image pickup element, converts a still image of an object into an electric signal and outputs it as a color video signal. In addition, in the present embodiment, the solid image pickup element of about 1000×1000 picture elements is assumed to be used for the image pickup element 1. When the solid image pickup element is used for the image pickup element 1, a color filter as well-known is provided in front of the light receiving surface of the element 1. An output of the image pickup element 1 is given to a signal processing circuit 20 and subjected to a predetermined signal processing therein, the signal processing including various processings, but the present embodiment is assumed to include the conversion into R, G and B signals. An output signal of the signal processing circuit 20 is given to a video RAM 7 and stored therein. In addition, the video RAM 7 has capacity of storing at least one picture plane of still picture data of the object. For example, as shwon in the present embodiment, when the color video signals converted into R, G and B signals are stored, 1000×1000 ×8 bits×3=24M bits are required, which is easy to realize when combined with a semiconductor memory of a plurality of chips. In addition, in consideration of rapid progress of the semiconductor memory, one chip thereof will be realized in the future. The R, G and B signals read-out of the video RAM 7 are given to a recording device 4, printer format conversion circuit 8, and NTSC format conversion circuit 9, the recording device 4 being in the form of, for example, a floppy disc as a magnetic recording medium. Besides this, a VTR or the like may be used as the recording device 4. The printer format conversion circuit 8 converts the R, G and B signals read-out from the video RAM 7 into a format conformable with the printer connected as an external equipment. In other words, the printer format conversion circuit 8 converts the R, G and B signals into signals conformable with ink of Mg, Cy and Ye for the printer. The NTSC format conversion circuit 9 converts the R, G and B signals read-out from the video RAM 7 into the composite color TV signal of NTSC system. The output signal of the NTSC format conversion circuit 9 is used for the monitor TV as the external equipment and also given to an electronic view finder 10.

A microcomputer 11 controls operation of each circuit of the electronic still camera which comprises a CPU, a ROM and a RAM or the like as well-known. A keyboard 12 is connected to the microcomputer 11 and includes at least an image pickup switch 12a, a record switch 12b, a display end switch 12c, a read-out switch 12d and a print switch 12e. The microcomputer 11, in response to operation of the respective switches, executes various prepared programs, and also gives to a timing generator 13 a starting signal and a synchronizing signal. The timing generator 13 generates a driving signal in response to the synchronizing signal from the microcomputer 11 and gives it to the image pickup element 1. Also, the microcomputer 11 controls the write-in address and read-out address of the video RAM 7 and generates the synchronizing signal for controlling operations of the recording device 4, printer format conversion circuit 8, and NTSC format conversion circuit 9.

Next, explanation will be given on operation of the embodiment shown in FIG. 2 with reference to FIGS. 3 through 7 of flow charts explanatory of operation of the microcomputer 11 in FIG. 2.

[OPERATION OF IMAGE PICKUP MODE]

Figure 3:
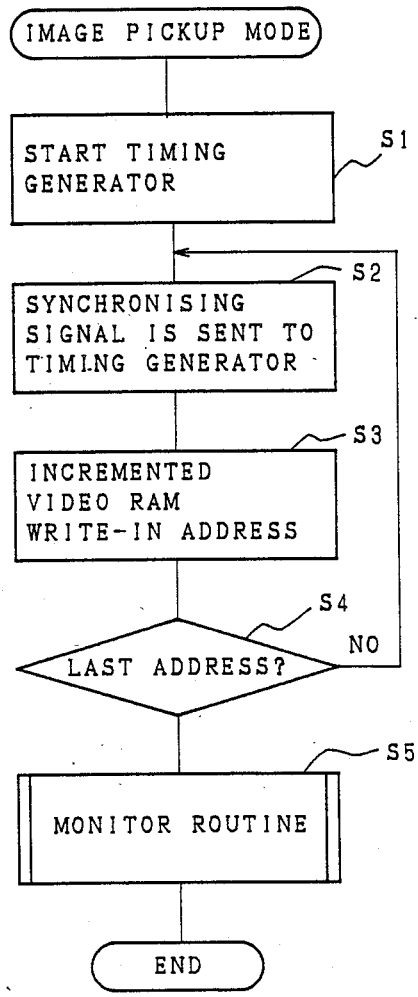
FIGS. 3 through 7 are flow charts explanatory of operation of the embodiment.

The image pickup mode is executed by depressing the image pickup switch 12a contained in the keyboard 12, in which the still picture of the object is picked up to be stored in the video RAM 7 and displayed on the electronic view finder 10 or an external monitor TV. The operation in the image pickup mode is shown in FIG. 3. Referring to FIG. 3, first, the microcomputer 11 delivers the starting signal to the timing generator 13 to start it (Step S1). Then, the synchronizing signal is sent to the timing generator 13 (Step S2). The timing generator 13, in response to the synchronizing signal, sends the driving signal to the image pickup element 1 and allow the image pickup element 1 to output a signal for one picture element. The signal processing circuit 20 converts into the R, G and B signals the picture element signal given from the image pickup element 1 and gives them to the video RAM 7, at which time the microcomputer 11 gives the write-in address (initially, the head address) to the video RAM 7 (Step S3). Therefore, the video RAM 7 stores R, G and B data corresponding to one picture element in the area corresponding to the write-in address. Next, the microcomputer 11 decides whether the write-in address generated at Step S3 is the last address, that is, whether or not the write-in for one still picture of the object ends (Step S4). If not the last address, that is, when the write-in for one still picture is not finished, the procedure returns to the operation of Step S2 so as to update the write-in address to the video RAM 7 and continue write-in. Hence, the R, G and B data of each picture element are written in each area of the video RAM 7. On the other hand, when the write-in address becomes the last address, in other words, when the write-in for one field ends, the procedure advances to a monitor routine (Step S5), thereby displaying the stored contents of the video RAM 7 on the electronic view finder 10 or the external monitor TV.

Figure 7:
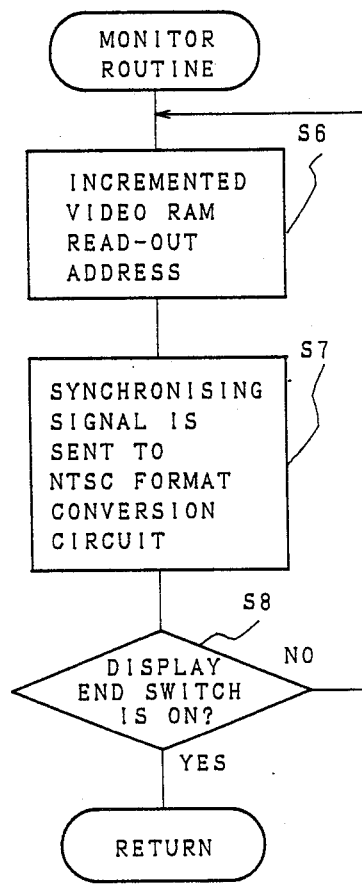

The monitor routine at Step S5 is detailed in FIG. 7. First, the microcomputer 11 generates read-out address (initially, the head address) of the video RAM 7 (Step S6). Successively, the synchronizing signal is sent to the NTSC format conversion circuit 9 (Step S7). Hence, the R, G and B data for one picture element is read out from the area of video RAM 7 corresponding to the read-out address and then given to the NTSC format conversion circuit 9. Also, the NTSC format conversion circuit 9 converts the R, G and B data read out from the video RAM 7 into the composite color TV signal of NTSC system. The output signal of NTSC format conversion circuit 9 is given to the electronic view finder 10 and displayed thereon. When the monitor TV is connected as the external equipment, the output signal of NTSC format conversion circuit 9 is given to the monitor TV and displayed thereon. Read-out from the video RAM 7 is continued until the display end switch 12c is depressed (Step S8). In addition, when the read-out address of the video RAM 7 becomes the last address, in the next read-out cycle, the read-out is returned to the head address and then carried out. Accordingly, the electronic view finder 10 and monitor TV display the still image of the object until the display end switch 12c is depressed. When the display end switch 12c is depressed, the procedure returns to the original flow. In the flow in FIG. 3, when the monitor routine ends, the image pickup mode ends.

Figure 1:
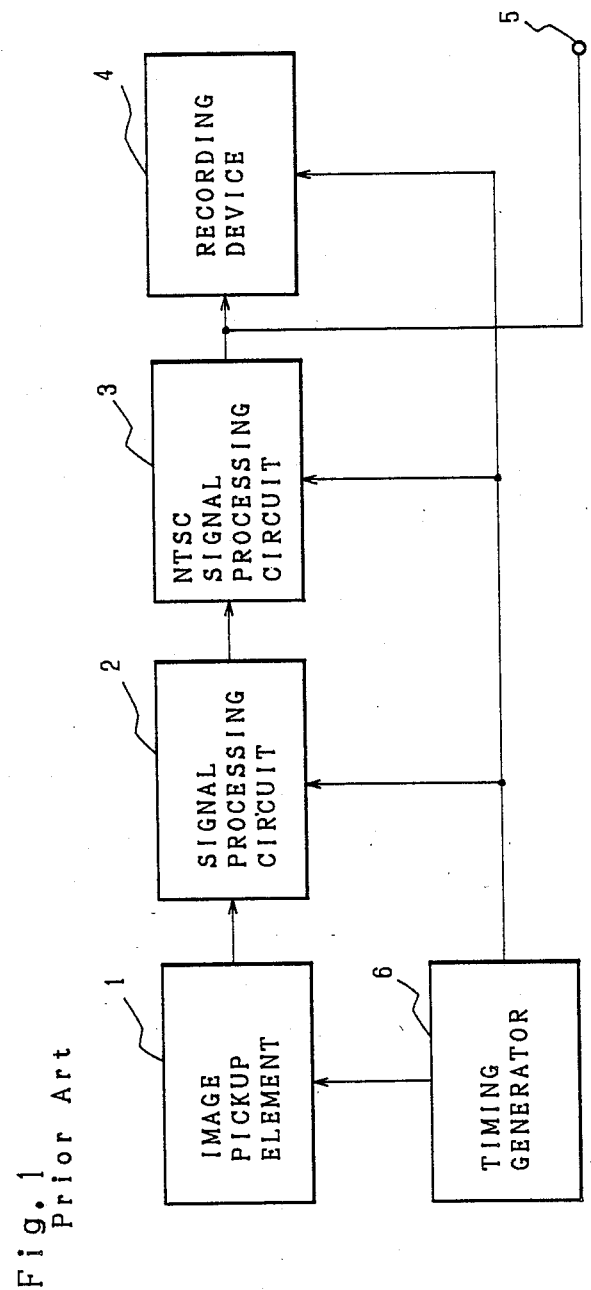
FIG. 1 is a schematic block diagram of the conventional electronic still camera.

The conventional electronic still camera shown in FIG. 1 should output the signal of NTSC system, whereby it is required to read out all the signals for one horizontal period (53 $\mu$s). Therefore, the image pickup element 1 outputs signals in order at about 20 MHz, the signal processing circuit 2 requiring a band of about 20 MHz.

On the contrary, in the embodiment shown in FIG. 2, the R, G and B signals outputted from the signal processing circuit 20 are once written in the video RAM 7 and the R, G and B data stored therein are adapted to be read out so as to be recorded or processed (for example, format conversion), in other words, the microcomputer 11 can independently control the operating speed of the image pickup element 1 separately from the device utilizing the output thereof, whereby the operating speed of image pickup element 1 is reducible more than that required in the NTSC system. Hence, the bands of image pickup element 1 and signal processing circuit 20 can be lowered, thereby preventing reduction of an S/N ratio. Actually, one horizontal period is performed several times as large as the NTSC system.

In the present embodiment, in order to raise the resolution when printed to be discussed below, the image pickup element 1 of 1000×1000 picture elements is used, in which the number of vertical scanning lines required for the monitor TV is about 500 lines. Hence, data of each line read out from the video RAM 7 is mixed into every two continuous lines, which is used as data for one line, thereby enabling a signal for the monitor TV to be outputted. Therefore, the NTSC format conversion circuit 9 includes a mixer for mixing every two lines of data for each line. Instead of such mixer, address control of the microcomputer 11 can carry out the equivalent processing to the above. In other words, the microcomputer 11 may control the vertical address of video RAM 7 so as to read out therefrom the data on every other line, or may mix two lines to be converted into one line data and then output it. Therefore, even when the video RAM 7 stores therein the data for vertical 1000 lines, the data can be converted into 500 scanning lines conformable to the monitor TV or the electronic view finder 10.

Meanwhile, the microcomputer 11 properly thins the horizontal read-out address at the video RAM 7, or the NTSC format conversion circuit 9 computes the read-out data of the video RAM 7 whereby the resolution need of signal band only be lowered. In addition, when the monitor TV is of high resolution TV, such as a high definition TV, the signal of 1000 horizontal picture elements may directly be outputted.

[OPERATION IN RECORDING MODE]

Figure 4:
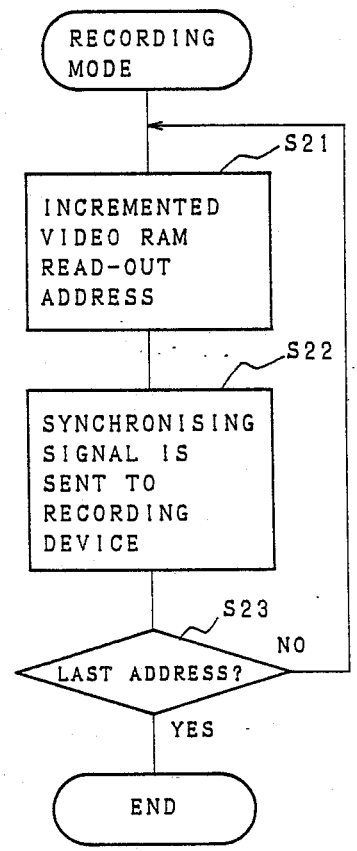

The recording mode is executed by depressing the record switch 12b included in the keyboard 12 and records in the recording device 4 the still picture data stored in the video RAM 7, the operation in the recording mode being shown in FIG. 4. Referring to FIG. 4, first, the microcomputer 11 outputs the read-out address (initially, the head address) to the video RAM 7 (Step S21). Successively, the same sends the synchronizing signal to the recording device 4 (Step S22). R, G and B data for one picture element are read out from the area of video RAM 7 corresponding to said read-out address and then given to the recording device 4 to be recorded. Next, it is decided whether the read-out address of the video RAM 7 is the last address, in other words, whether read-out of still picture data for one field ends (Step S23). If not the last address, the procedure returns to the Step S21 and updates the read-out address and continues the recording. When the read-out address becomes the last address, in other words, when recording of still picture data for one field ends, the operation in recording mode ends.

In addition, although the data (R, G and B data) read out from the video RAM 7 is recorded directly to the recording device 4 in the aforesaid embodiment, alternatively the signal separated to the luminance signal and chrominance signal may be recorded. In this case, a luminance signal and chrominance signal separation circuit is required to be provided between the video RAM 7 and the recording device 4.

[OPERATION IN READ-OUT MODE]

Figure 5:
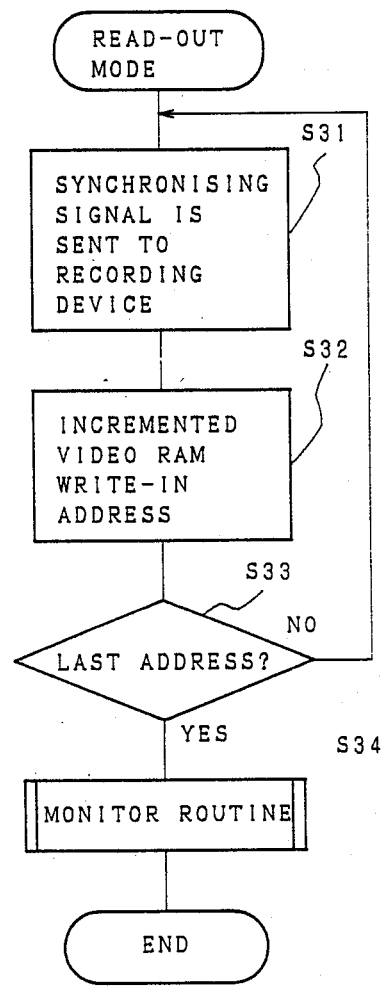

The read-out mode is executed by depressing the read-out switch 12d included in the keyboard 12, in which the still picture data stored in the recording device 4 is reproduced to be displayed on the electronic view finder 10 or the monitor TV, the operation of read-out mode being shown in FIG. 5. Referring to FIG. 5, first, the microcomputer 11 sends the synchronizing signal to the recording device 4 (Step S31). Successively, the write-in address (initially, the head address) is outputted to the video RAM 7 (Step S32). Therefore, the data for one picture element is reproduced from the recording device 4 and written in the area of the video RAM 7 corresponding to the write-in address. Next, the microcomputer 11 decides whether the write-in address of the video RAM 7 is the last address (Step S33) and repeats the operations in Steps S31 and S32 until reproduction and write-in of the still picture data for one field ends. When the still picture data for one field ends its reproduction and write-in, the monitor operation is carried out in Step S34, which is the same as that in Step S5 shown in FIG. 3 and detailed in FIG. 7. The still picture data is read out from the video RAM 7, converted by the NTSC format conversion circuit 9 into the NTSC system composite color TV signal, and thereafter displayed on the electronic view finder 10 or monitor TV, the display continuing until the display end switch 12c is depressed.

[OPERATION IN PRINTING MODE]

Figure 6:
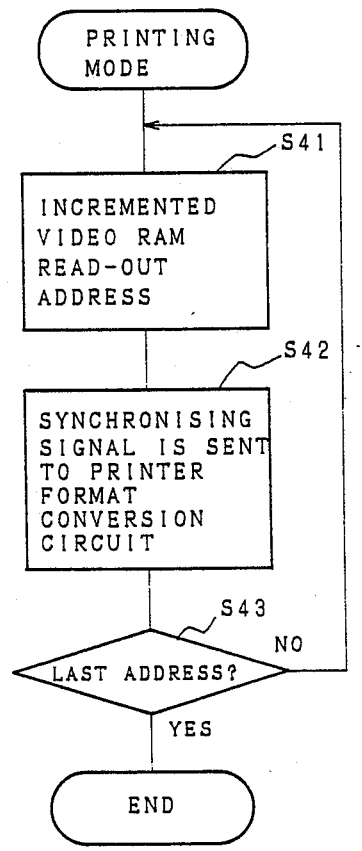

The printing mode is executed by depressing the print switch 12e included in the keyboard 12, which reads out the still picture data stored in the video RAM 7 and converts it into format conformable to the printer, the operation in the printing mode is shown in FIG. 6. Referring to FIG. 6, first, the microcomputer 11 outputs the read-out address (initially, the head address) to the video RAM 7 (Step S41). Successively, the synchronizing signal is sent to the printer format conversion circuit 8 (Step S42). Hence, R, G and B data for one picture element is read out from the area of the video RAM 7 corresponding to said write-in address and converted by the printer format conversion circuit 8 into the signal applied to the printer. The operations in Steps S41 and S42 are carried out until the read-out of the still picture data for one field ends. When read-out of the still picture data for one field ends, the printing mode ends.

As above-mentioned, in the printing mode, all the R, G and B data for 1000×1000 picture elements stored in the video RAM 7 are converted into the format for the printer and printed thereby, whereby the printed output of high resolution can be expected. In addition, although the image pickup element 1 of 1000 ×1000 picture elements is used in the above embodiment, if an image pickup element of further high resolution is used, the printed output of further higher resolution is realizable. For example, when the conventional silver salt photograph is used as the printer, ten times or more number of picture elements than that of the above embodiment is required. In this case, the line mixing processing at the NTSC format conversion circuit 9 or the control of the read-out address of video RAM 7 by the microcomputer 11 are required to be somewhat changed so as to reduce the number of vertical lines to conform to the NTSC system.

In addition, in the aforesaid embodiment, since the picture element data separated to the R, G and B signals are written in the video RAM 7, the video RAM 7 requires capacity of 24M bit. Alternatively, the picture element data comprising the luminance signal and chrominance signal may be written in the video RAM 7. In this case, the resolution is somewhat deteriorated, but the capacity of video RAM 7 is reducible.

In a case where the monitor TV of RGB input is used as a monitor TV, the R, G and B signals converted only of the number of scanning lines may directly be outputted to the monitor TV. In this case, since the format conversion to the NTSC system is needless, the resolution for the reproduced picture on the monitor TV is further improved.

Also, in the above embodiment, it is considered that the composite color TV signal of NTSC system is displayed on the electronic view finder 10, but the resolution of the electronic view finder is generally deteriorated more than the monitor TV, so a color video signal subjected further to reduction processing of scanning lines in comparison with the monitor TV may alternatively be outputted to the electronic view finder 10.

Also, in the above embodiment, the image pickup element 1 is adapted to be driven by the timing generator 13 controlled by the microcomputer 11, but the element 1 may alternatively be driven directly by the output of the microcomputer 11.

Furthermore, in the above embodiment, the processed color video signal, such as the chrominance signal is recorded in the video RAM 7, but alternatively, the output signal of image pickup element 1 may be directly introduced to the video RAM 7 so as to carry out the signal processing therein equivalently to the signal processing circuit 20.

As seen from the above, the present invention can control the operating speed of image pickup means quite independently of other apparatus utilizing the output thereof, whereby there is no need of having a high frequency characteristic even if the resolution of the image pickup element is raised. As a result, the electronic still camera extremely superior in quality of satisfying both the high resolution and low noises is obtainable.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An electronic still camera comprising:
   an image pickup means for photoelectrically converting an image of an object to output video signals comprising picture elements;
   an image storage means for storing said video signals for at least one picture plane;
   a recording means for recording said video signals read out from said image storage means;
   a processing means for processing said video signals read out from said image storage means;
   a first control means for synchronously writing, at a first clock frequency, the output video signals of said image pickup means to said image storage means; and
   a second control means for synchronously reading out, at a second clock frequency, the video signals stored in said storage means to said processing means, said second clock frequency being greater than said first clock frequency.

2. An electronic still camera as set forth in claim 1, wherein said processing means includes a conversion means for converting said video signals read out from said image storage means into a signal different in format.

3. An electronic still camera as set forth in claim 2, wherein said conversion means includes means for converting said video signals read out from said image storage means into a TV signal of NTSC system.

4. An electronic still camera as set forth in claim 3, further comprising an electronic view finder for monitoring said TV signal of NTSC system.

5. An electronic still camera as set forth in claim 2, wherein said conversion means includes means for converting said video signals read out from said image storage means into a TV signal of a high resolution TV format.

6. An electronic still camera as set forth in claim 5, further comprising an electronic view finder for monitoring said TV signal of a high resolution TV format.

7. An electronic still camera as set forth in claim 2, wherein said conversion means includes means for converting a color video signal read out from said image storage means into a printer format.

8. An electronic still camera as set forth in claim 1, wherein said recording means includes a floppy disc device.

9. An electronic still camera as set forth in claim 1, further comprising a signal separation means for separating said video signals read out from said image storage means into a luminance signal and a chrominance signal.

10. An electric still camera as set forth in claim 9, wherein said recording means records said luminance signal and chrominance signal.

11. An electric still camera as set forth in claim 2, wherein said video signals are stored in said image storage means in data line format and said conversion means comprises means for mixing data lines read out from said image storage means.

* * * * *